(12) United States Patent
Dalmolen

(10) Patent No.: US 10,711,925 B2
(45) Date of Patent: Jul. 14, 2020

(54) HIGH PRESSURE PIPE AND METHOD FOR PRODUCING SUCH PIPE

(71) Applicant: Pipelife Nederland B.V., Enkhuizen (NL)

(72) Inventor: Lambertus Gerrit Peter Dalmolen, Zaandam (NL)

(73) Assignee: Pipelife Nederland B.V., Enkhuizen (NL)

( * ) Notice: Subject to any disclaimer, the term of this patent is extended or adjusted under 35 U.S.C. 154(b) by 209 days.

(21) Appl. No.: 15/759,852

(22) PCT Filed: Aug. 30, 2016

(86) PCT No.: PCT/NL2016/050604
§ 371 (c)(1),
(2) Date: Mar. 14, 2018

(87) PCT Pub. No.: WO2017/048117
PCT Pub. Date: Mar. 23, 2017

(65) Prior Publication Data
US 2018/0252339 A1  Sep. 6, 2018

(30) Foreign Application Priority Data
Sep. 14, 2015 (NL) .................... 2015434

(51) Int. Cl.
*F16L 11/08* (2006.01)
*F16L 58/16* (2006.01)
*B29C 53/60* (2006.01)
*B29C 70/30* (2006.01)
*B29K 21/00* (2006.01)
(Continued)

(52) U.S. Cl.
CPC ............. *F16L 11/082* (2013.01); *F16L 58/16* (2013.01); *B29C 53/60* (2013.01); *B29C 70/30* (2013.01); *B29K 2021/00* (2013.01); *B29K 2307/04* (2013.01); *B29L 2023/005* (2013.01)

(58) Field of Classification Search
CPC ............................... F16L 11/082; F16L 58/16
USPC .................................................. 138/174, 125
See application file for complete search history.

(56) References Cited

U.S. PATENT DOCUMENTS 5,064,491 A * 11/1991 Huvey .................... B29C 53/12
                                                                156/173
6,248,443 B1   6/2001 Fernandez et al.
(Continued)

FOREIGN PATENT DOCUMENTS

EP      1419875 A1    5/2004
EP      2719824 A1    4/2014
(Continued)

*Primary Examiner* — Patrick F Brinson
(74) *Attorney, Agent, or Firm* — N. V. Nederlandsch Octrooibureau; Catherine A. Shultz; Katelyn J. Bernier

(57) ABSTRACT

A high-pressure pipe comprises an inner liner (1), an outer coating layer (6) and a reinforcement layer (2, 5) positioned between the inner liner and the outer coating layer. The reinforcement layer has helically wound strips (2, 5) which each comprise a matrix (4) and fibers (3) embedded in the matrix; the fibers consist of a multitude of twisted high-strength filaments. With an aim of providing a relatively high bending flexibility, the filaments of a fiber are sized filaments obtained by subjecting the filaments to a sizing operation.

15 Claims, 1 Drawing Sheet

(51) Int. Cl.
    *B29K 307/04* (2006.01)
    *B29L 23/00* (2006.01)

(56) References Cited

U.S. PATENT DOCUMENTS

| | | | |
|---|---|---|---|
| 6,491,779 B1 * | 12/2002 | Bryant | F16L 11/081 156/169 |
| 6,620,471 B1 | 9/2003 | Do | |
| 6,804,942 B2 * | 10/2004 | Bryant | F16L 11/081 57/10 |
| 6,899,140 B2 * | 5/2005 | Fraser | F16L 9/12 138/134 |
| 7,254,933 B2 * | 8/2007 | Bryant | F16L 11/083 57/232 |
| 7,781,040 B2 * | 8/2010 | Coyle | F16L 11/081 138/129 |
| 8,640,739 B2 * | 2/2014 | Do | F16L 11/083 138/130 |
| 9,079,353 B2 * | 7/2015 | Sheldrake | F16L 11/083 |
| 2008/0006338 A1 | 1/2008 | Wideman et al. | |

FOREIGN PATENT DOCUMENTS

| | | |
|---|---|---|
| JP | 2002226812 A | 8/2002 |
| WO | 2013/071449 A1 | 5/2013 |
| WO | 2013/131972 A1 | 9/2013 |

* cited by examiner

HIGH PRESSURE PIPE AND METHOD FOR PRODUCING SUCH PIPE

The invention is related to a high-pressure pipe, comprising an inner liner, an outer coating layer and a reinforcement layer positioned between the inner liner and the outer coating layer, said reinforcement layer comprising helically wound strips which each comprise a matrix and fibers embedded in the matrix, said fibers comprising twisted high-strength filaments.

Such a high-pressure pipe is generally known, e.g. from WO-A-2013/131972. The helically wound reinforcing elements, in the form of strips of said prior art pipe may comprise carbon fibers, consisting of a large number of thin filaments. Carbon fibers have several advantages; for instance such fibers are largely invulnerable with respect to aggressive substances such as $H_2S$ as present in crude oil. Furthermore, the carbon fibers have a high tensile strength and a high modulus of elasticity. Such properties provide the pipes in question with the capacity to withstand high pressures, up to 200 bar or higher. Carbon fibers per se are however problematic with respect to handling. The filaments have a high stiffness and hardness, which makes it difficult to implement such fibers directly in the pipe wall. With the aim of facilitating the handling of the carbon fibers, they can be impregnated with a matrix material and then assembled so as to form carbon fiber reinforcing elements, for instance, in the form of strips Due to the circumstance that the carbon filaments are embedded in, and thereby connected to each other by, the matrix material, the reinforcing elements exhibit a relatively high bending stiffness. This relatively high bending stiffness of the fibers is not conducive for carrying out winding operations, as are for instance applied in manufacturing high-pressure pipes. This means that in the process of manufacturing high-pressure pipes, the reinforcing elements in question should have a rather limited thickness so as to limit their bending stiffness and so as to be able to wind the fibers around the inner lining. In case the reinforcing strips are thin, this means that a relatively high number of strips are to be wound around the inner lining so as to achieve the required strength and stiffness of the pipe wall.

The process of winding multiple layers of strips with embedded fibers is however intricate and time-consuming. It would be preferable to complete the winding process with a limited number of strips, preferably two oppositely wound strips. The number and the thickness of the fibers in each of those strips would then have to be increased. However, the stiffness of the strips thus obtained would severely limit the possibility to wind these around the inner lining. Moreover, the pipe itself would be rather stiff with respect to bending, making it almost impossible to wind the pipe onto a reel.

An object of the invention is therefore to provide a high-pressure pipe of the type mentioned before which can be manufactured from a limited number of strips, and which still has the advantages associated with high-strength fibers. A further object is to provide such pipe which can be wound onto a reel of limited radius. This object is achieved in that the filaments of a fiber are sized filaments obtained by subjecting the filaments to a sizing operation before twisting them together in the step of forming fibers.

The sizing operation of the filaments has the advantage that it allows for some displacement between adjacent filaments, in contrast to filaments which are fixedly adhered to each other through a stiff matrix such as a solidified resin. The filaments are twisted so as to form a fiber, possibly in the presence of additional material which promotes the cohesion of the twisted filament bundle. The filaments should still be able to displace somewhat with respect to each other in the fiber, which makes it possible to bend the fiber even in case the thickness of the fiber, and thereby the number of twisted filaments in the fiber, is relatively high.

A sizing operation is well known per se in the field of textile material. A sizing operation entails for instance the use of sizing agents or chemicals, such as liquid resins, oil-type and wax-type materials.

Preferably, the filaments are unimpregnated filaments. Typically, the filaments have a thickness of 4-100 µm, or 4-50 µm, or 4-10 µm. Preferably, the filaments are carbon filaments. Optionally, the filaments are coated with a flexible coating, e.g. a rubber-like coating. Typically, the filaments have a length which is of the same order of magnitude as the length of the fiber containing said filaments.

The invention is furthermore related to a method for producing a high-pressure pipe, comprising the steps of:
  providing high-strength filaments,
  sizing said high-strength filaments,
  twisting said sized high-strength filaments so as to form fibers,
  embedding the fibers in a matrix so as to form a strip,
  providing a tube-shaped inner lining,
  helically winding strips on top of each other and with opposite winding angle around the inner lining,
  providing an outer coating on top of the helically wound strips.

The filaments are preferably unimpregnated filaments, and preferably during the step of embedding the fibers in the matrix the unimpregnated state the filaments of the fibers is maintained. Unimpregnated fibers are fibers which are not impregnated with matrix material or other materials which make the fibers adhere to each other in such a way that no or hardly no relative displacements are possible. Thus it can be ensured that the filaments in an unimpregnated fiber may perform relative displacements with respect to each other so as to maintain a certain bending flexibility of the fibers. Additionally, preferably the fibers and the matrix are selected from materials which exclude or inhibit adhesion between said fibers and said matrix. The lack of a (strong) adhesion between the fibers and the surrounding matrix also promotes the bending flexibility of the strips, making it further possible to wind the strips at a relatively small radius.

Optionally, the fibers, before embedding thereof in the matrix, may be dipped in a mixture so as to cover said fibers with a rubber-like substance.

The invention will further be described with reference to the embodiments shown in the drawings.

Figure 1:
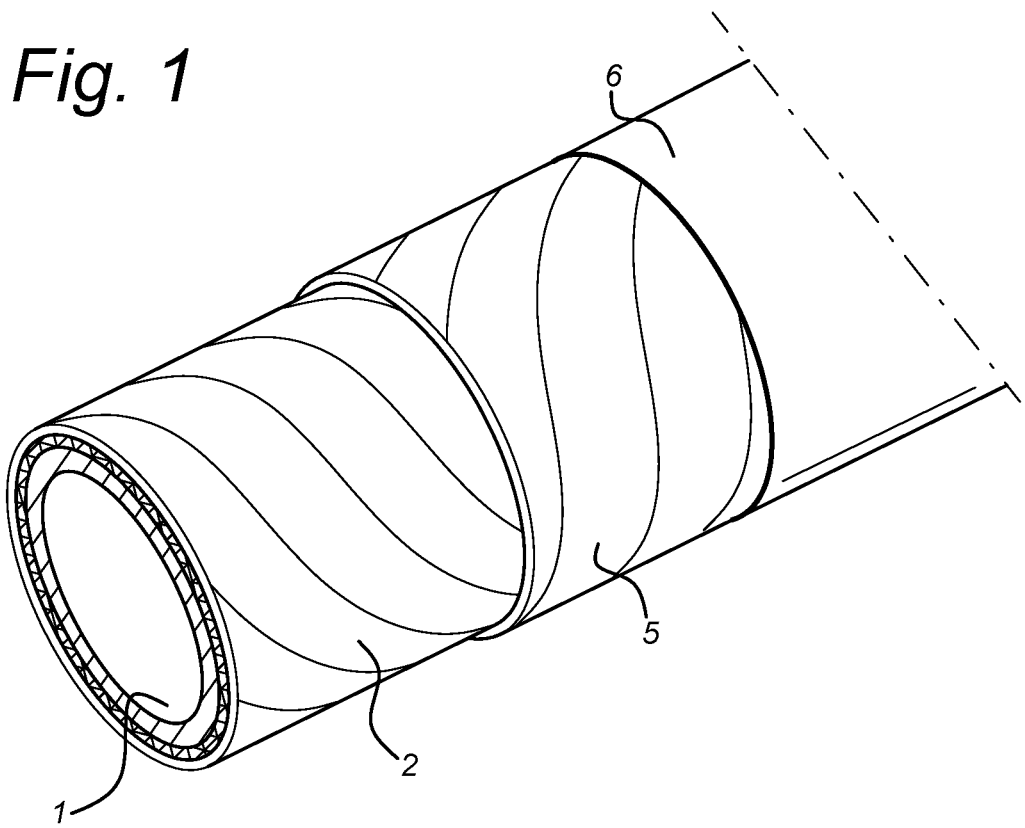
FIG. 1 shows a view in perspective and in section of the high-pressure pipe.
Figure 2:
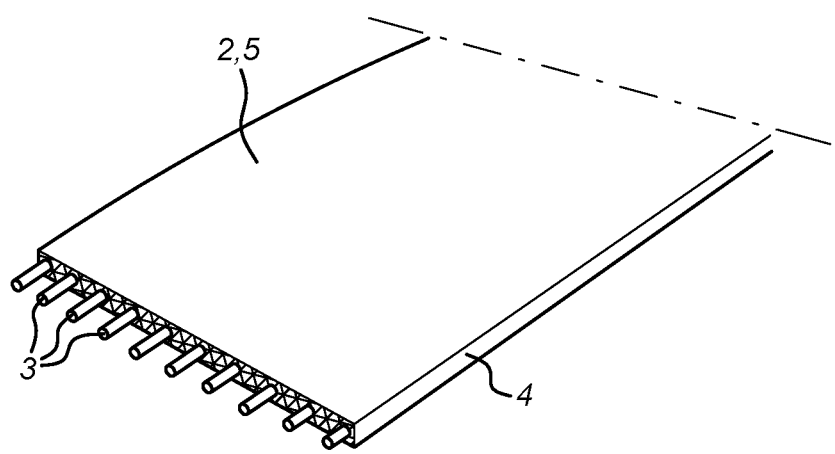
FIG. 2 shows a view in perspective on a reinforcement strip for the pipe.

The pipe as shown in FIG. 1 consists of an inner lining 1 around which first of all the reinforcement strip 2 is helically wound. Subsequently, onto said first reinforcement strip 2, the second reinforcement strip 5 is helically wound, with an opposite winding angle. Next, an outer coating layer 6 is applied onto the second helically wound reinforcement strip 5.

Each reinforcement strip 2, 5 consists of a body of matrix material 4 and the fibers 3 embedded in the body of matrix material 4. The fibers 3 each consist of carbon filaments of which are twisted into each other. These filaments have been subjected to a sizing operation, and furthermore they are not an impregnated with the matrix material 4. As a result, the fibers have a relatively high bending flexibility. Due to the circumstance that the fibers 3 are not adhered to the surrounding body of matrix material 4, the reinforcement strip itself has a relatively high bending flexibility as well.

As a result, the reinforcement strips 2, 5 can be wound with a relatively small radius around the inner liner. This relatively small bending radius can even be obtained in case the fibers 3 have a relatively large thickness and thus a relatively large number of twisted carbon fibers this means that a limited number, in particular only two, of reinforcement strips 2, 5 will be sufficient for manufacturing a pipe with a high resistance against internal pressures. Furthermore, the pipe itself will combine relatively high stiffness and strength against internal overpressures with a relatively low bending flexibility. Thus, such pipe is suitable for winding on a reel, which greatly simplifies the production and transport of the pipes.

LIST OF REFERENCE NUMERALS

1. Internal liner
2. First reinforcement strip
3. Fibers
4. Body of matrix material
5. Second reinforcement strip
6. Coating layer While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular and/or preferred embodiments disclosed, but that the invention will include all embodiments falling within the scope of the appended claims

The invention claimed is:

1. A high-pressure pipe, comprising an inner liner, an outer coating layer and a reinforcement layer positioned between the inner liner and the outer coating layer, said reinforcement layer comprising a first helically wound strip and a second helically wound strip wound with an opposite winding angle to the first helically wound strip, each strip comprising a matrix and a single row of fibers embedded in the matrix, said fibers comprising twisted high-strength carbon filaments, wherein the filaments of said fibers are sized filaments obtained by subjecting the filaments to a sizing operation.

2. The high-pressure pipe according to claim 1, wherein the filaments are unimpregnated filaments.

3. The high-pressure pipe according to claim 1, wherein the filaments have a thickness of 4-100 μm.

4. The high-pressure pipe according to claim 1, wherein the filaments are coated with a flexible coating.

5. The high-pressure pipe according to claim 4, wherein the flexible coating comprises a rubber-like coating.

6. The high-pressure pipe according to claim 1, wherein the filaments have a length which is of the same order of magnitude as the length of said fibers containing said filaments.

7. The high-pressure pipe according to claim 1, wherein the reinforcement layer comprises only two oppositely wound helical strips.

8. The high-pressure pipe according to claim 1, wherein a matrix material is lacking between the filaments of said fibers.

9. A method for producing a high-pressure pipe, comprising the steps of:
   providing high-strength carbon filaments,
   sizing said high-strength filaments,
   twisting said sized high-strength filaments to form fibers,
   embedding the fibers in a matrix to form a strip of a single row of fibres embedded in the matrix,
   providing a tube-shaped inner lining,
   helically winding strips on top of each other and wound with opposite winding angles around the inner lining, and
   providing an outer coating on top of the helically wound strips.

10. The method according to claim 9, wherein the filaments are unimpregnated filaments.

11. The method according to claim 10, wherein during the step of embedding the fibers in the matrix the unimpregnated state of the filaments of the fibers is maintained.

12. The method according to claim 9, wherein the fibers and the matrix are selected from materials which exclude or inhibit adhesion between said fibers and said matrix.

13. The method according to claim 9, wherein the fibers, before embedding thereof in the matrix, are dipped in a mixture so as to cover said fibers with a rubber-like substance.

14. The method according to claim 9, wherein the filaments of the fibers are arranged next to each other without interposition of a matrix material between said filaments.

15. A strip for use in the method according to claim 10, comprising a matrix and a single row of fibers embedded in the matrix, said fibers comprising twisted high-strength filaments, wherein the filaments of said fibers are sized filaments obtained by subjecting the unimpregnated filaments to a sizing operation.

* * * * *